(12) United States Patent
Vossler

(10) Patent No.: US 6,317,593 B1
(45) Date of Patent: *Nov. 13, 2001

(54) INTELLIGENT CELLULAR TELEPHONE FUNCTION

(75) Inventor: Stephen P. Vossler, Sioux Falls, SD (US)

(73) Assignee: Gateway, Inc., North Sioux City, SD (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/695,925

(22) Filed: Aug. 12, 1996

(51) Int. Cl.$^7$ .............................. H04M 3/42; H04M 3/00

(52) U.S. Cl. ........................................... 455/414; 455/418

(58) Field of Search .................................... 455/422, 425, 455/550, 552, 417, 409, 405, 556, 567, 418, 414, 574; 379/215, 211, 199

(56) References Cited

U.S. PATENT DOCUMENTS

| | | | |
|---|---|---|---|
| 4,481,382 | * 11/1984 | Villa-Real | 455/556 |
| 4,796,223 | 1/1989 | Sugita et al. | 364/900 |
| 4,860,005 | 8/1989 | DeLuca et al. | 340/825 |
| 4,872,005 | * 10/1989 | DeLuca et al. | 340/825.44 |
| 4,969,180 | * 11/1990 | Watterson et al. | 455/555 |
| 5,001,969 | 3/1991 | Moore et al. | 99/282 |
| 5,016,269 | * 5/1991 | Rogers | 455/404 |

(List continued on next page.)

FOREIGN PATENT DOCUMENTS

| 0399520 | 11/1990 | (EP) . |
|---|---|---|
| WO 96/38010 | 11/1996 | (WO) . |

OTHER PUBLICATIONS

"Digital Cellular Phone Solutions—TCM4300", http://www.ti.com/sc/docs/apps/wireless/techapp/digital1.htm, Texas Instruments Incorporated, 1 page, (1996).

"Nokia 232 Cellular Phone—232 The Absolute Analog", http;//businesswebusa.com/parrot/phones/nokia232.htm, Nokia Mobile Phones, 3 pages, (1995).

"Qua/Comm's QCP–800 Features & Technical Specifications", http;//www.qualcom.com/cdma/phones/qcp800/features.html, QUALCOMM Incorporated, 1 page, (Jan. 30, 1996).

"Model AH 5000 Portable Cellular Phone", http://www.mitsubishi.com/groups/mwci.AH–5000.htm, Mitsubishi Wireless Communications, Inc., 3 pages.

"CTIA Certifies Mitsubishi Wireless' Smallest, Lightest Cellular Phone", Wireless '96 Press Releases, http://www.wireless96.org/dallas/press/mitsubishi5.html, 2 pages, (Mar. 21, 1995).

"Low Power Clock Calendar PCF8593", Product Specification, Philips Semiconductors, 2–27, (Jul. 1994).

*Primary Examiner*—Tracy Legree
(74) *Attorney, Agent, or Firm*—Schwegman, Lundberg, Woessner & Kluth, P.A.; Kenneth Cool

(57) ABSTRACT

A programmable cellular telephone activates selected functions based on a user modifiable schedule, The user stores schedule information in a schedule table for automatic function activation/deactivation. A controller controls all cellular telephone functions, and comprises a memory and a clock. The controller also comprises an automatic scheduler which activates and deactivates cellular telephone functions according to the entries in the schedule table. Cellular telephone functions are activated and deactivated either manually or when the automatic scheduler is enabled and the real time corresponds with the scheduled time in the schedule table. By using the scheduler, a user can select time periods when calls are receivable without having to remember to turn on the cellular phone, extending battery life and minimizing unwanted interruptions.

22 Claims, 8 Drawing Sheets

U.S. PATENT DOCUMENTS

| | | | |
|---|---|---|---|
| 5,128,981 | * 7/1992 | Tsukamoto et al. | 455/567 |
| 5,241,542 | 8/1993 | Natarajan et al. | 370/95.3 |
| 5,247,700 | * 9/1993 | Wohl et al. | 455/552 |
| 5,257,406 | * 10/1993 | Ito | 455/419 |
| 5,317,626 | * 5/1994 | Jaynes et al. | 379/67.1 |
| 5,377,256 | * 12/1994 | Franklin et al. | 379/45 |
| 5,386,455 | 1/1995 | Cooper | 379/58 |
| 5,388,148 | * 2/1995 | Seiderman | 455/409 |
| 5,475,374 | 12/1995 | Moore | 340/825 |
| 5,479,476 | * 12/1995 | Finke-Anlauff . | |
| 5,485,505 | 1/1996 | Norman et al. | 379/58 |
| 5,610,970 | * 3/1997 | Fuller et al. | 455/417 |
| 5,625,683 | * 4/1997 | Nazanin et al. | 379/355 |
| 5,754,956 | * 5/1998 | Abreau et al. | 455/434 |
| 5,794,142 | * 8/1998 | Vanttila et al. | 455/414 |
| 5,946,636 | * 8/1999 | Uyeno et al. | 455/566 |

* cited by examiner

INTELLIGENT CELLULAR TELEPHONE FUNCTION

FIELD OF THE INVENTION

The present invention relates in general to methods and apparatus for controlling the operation of a cellular telephone, and particularly to programmable automatic activation and deactivation sequences.

BACKGROUND OF THE INVENTION

Cellular telephones have become ubiquitous in today's society, playing an important roll in many areas of daily life. The technology has reached the point where cellular telephones are manufactured with the same features as regular telephones, including speed dial and number recall. A user such as a physician or salesperson has the capability to be constantly in communication without having to stop at pay telephones or use specialized communication equipment. Power conservation is a constant concern for the user. As cellular telephones are generally either self-contained or mounted in a vehicle, however, a user must, particularly in the case of self-contained units, maintain sufficient power to ensure that the telephone will work when it is needed. The most efficient means of power conservation is to turn the telephone on only when the user wishes to send or receive calls. Another consideration is that the ability of the outside world to make contact no matter where a person is may be more than the user bargained for—so long as the telephone is activated the user will receive calls. The impact of this exposure can range from mere inconvenience to significant annoyance at the unwanted intrusion. There is no convenient method for controlling the use of air time—the only sure method of preventing unwanted incoming calls is to turn off the telephone. If, however, the user wants the telephone turned on for only certain time periods, the user must constantly remember to turn their cellular telephone on when they want to be able to receive calls and off when they do not want incoming calls or when they want to conserve battery life. What is needed is a better way to schedule cellular telephone availability.

As each user's communication requirements vary, so do the periods of time which each user wants or needs their telephone activated. Some need to have their telephone on all day every day. Others only activate their telephone when they wish to make outgoing calls. The majority of cellular telephone users, however, have particular periods of the day or week during which they wish to send or receive calls. Some of these users need additional telephone functions such as call forwarding or call waiting available at the same or different times. For example, a person may not want to receive calls on the cellular telephone or deplete its power resources while they are at work or home. However, when they cannot be reached by a regular telephone, such as when they are driving to or from work, the user may then want to be able to receive calls. A user who wishes to activate a cellular telephone during specific periods of the day must remember to activate and deactivate the telephone. What is needed is a convenient way to ensure a cellular telephone is ready to send and receive calls, or perform other of the cellular telephone's functions, according to a particular user's needs.

SUMMARY OF THE INVENTION

The present invention teaches a method and apparatus for programming a cellular telephone for automatic initiation of the telephone's various functions according to the user's needs. One embodiment of the present invention is a cellular telephone comprising a power source, a controller for controlling the cellular telephone, communication circuitry for sending and receiving signals, and a power switch electrically located between the power source and the communication circuitry. The power switch controls the application of power to the communication circuitry. The controller is electrically coupled to the power switch and controls the power switch to apply power to the circuitry in accordance with a schedule. The controller is also directly connected to the power source and the communication circuitry.

The controller also comprises a clock, which in one embodiment is a real-time clock. Output from the clock is used in conjunction with the schedule to allow the user to conveniently control activation of the telephone's functions, as well as make efficient use of the telephone's power supply. According to another embodiment of the present invention the controller further comprises a memory for storing the schedule. Having the schedule stored in memory ensures that the cellular phone will be ready to send and receive calls, as well as perform other functions, according to the user's needs. In another embodiment of the present invention the cellular telephone further comprises an interface for modifying the schedule stored in the memory. In one embodiment the interface is incorporated in the telephone keypad. Yet another embodiment comprises a means for activating and deactivating the controller. In a further embodiment, the alarm function of the clock is integrated such that it causes the phone to ring at a time set by the user. According to another embodiment, the user may create a message to be displayed on the telephone's display in conjunction with an alarm.

A method of internally controlling cellular telephone functions is also provided. The method comprises the steps of providing a clock signal representative of time, providing a schedule representative of time periods when desired functions are to be enabled, comparing the clock signal with the schedule, and enabling desired cellular telephone functions based on the comparison of the clock signal with the schedule. In yet another embodiment of the present invention the method of controlling cellular telephone functions further comprises the step of revising the schedule using a user interface.

DETAILED DESCRIPTION OF THE PREFERRED EMBODIMENTS

In the following detailed description, reference is made to the accompanying drawings which form a part hereof, and in which is shown by way of illustration specific embodiments in which the invention may be practiced. These embodiments are described in detail sufficient to enable those skilled in the art to practice the invention, and it is to be understood that other embodiments may be utilized and that structural, logical and electrical changes may be made without departing from the spirit and scope of the present invention. The following detailed description is, therefore, not to be taken in a limiting sense, and the scope of the present invention is defined by the appended claims.

Figure 1:
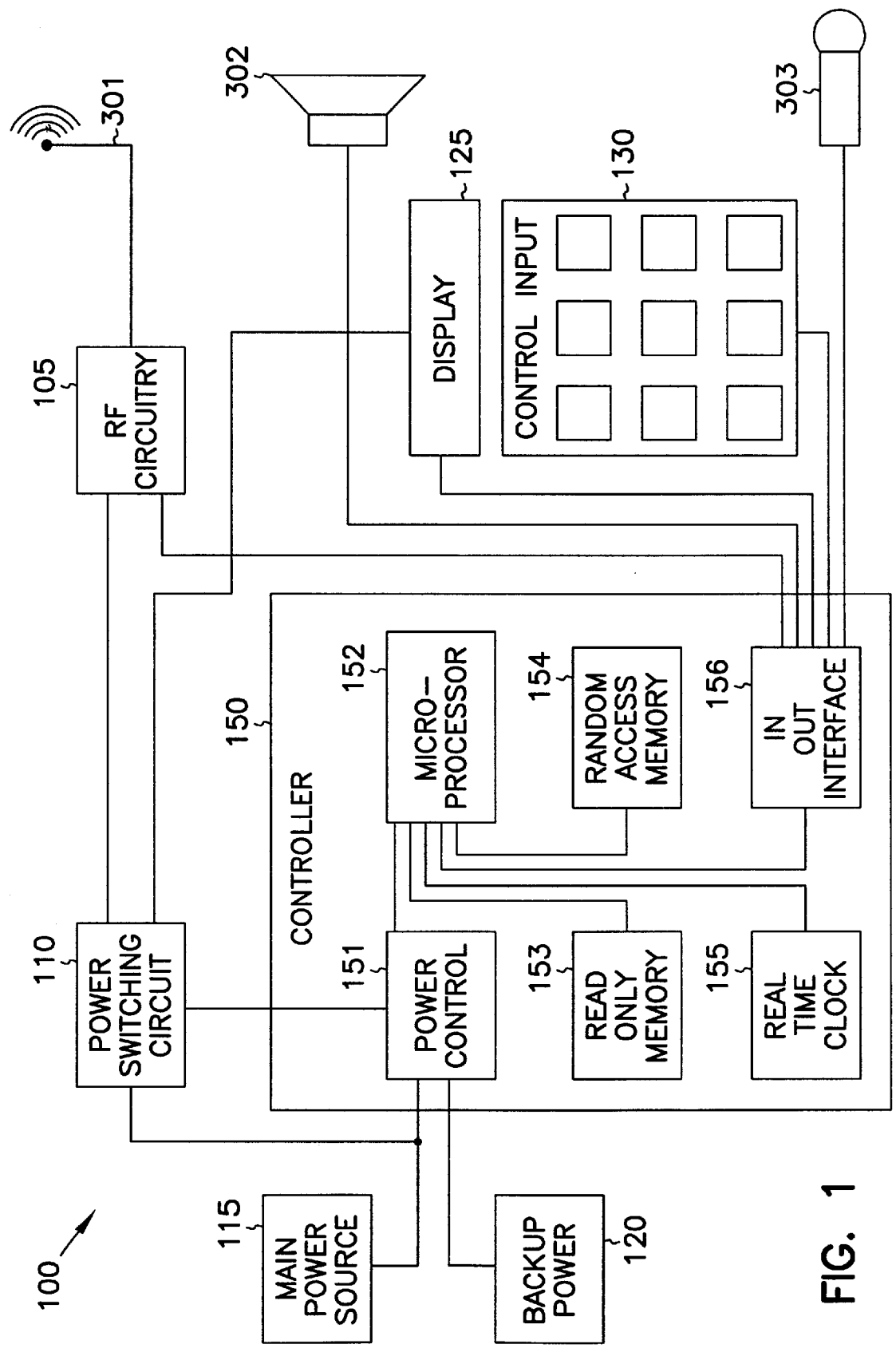
FIG. 1 is a block schematic diagram of a cellular telephone according to one embodiment of the present invention.

FIG. 1 shows the circuitry of a cellular telephone 100 according to one embodiment of the present invention. Those skilled in the art will, however, recognize that the present invention may be incorporated into any of a variety of wireless personal communication devices having cellular telephone capability. Cellular telephone 100 receives and transmits signals by radio frequency (RF) circuitry 105 via antenna 301. Audio signals are output through speaker 302 and input through microphone 303. User input interface 130 provides a means through which a user enters commands and otherwise interacts with the telephone's various functions. In one embodiment user input interface 130 comprises a standard twelve key telephone pad and an additional pad for control keys (shown in FIG. 3), but other configurations are easily incorporated without affecting the scope of the claimed invention.

In a preferred embodiment, controller 150 (FIG. 1) is a customized application specific integrated circuit (ASIC). It incorporates power control device 151, read-only memory (ROM) 153, real time clock 155, microprocessor ("processor") 152, random access memory (RAM) 154, and input/output interface 156. In another embodiment the individual devices are separate chips electronically interlinked to processor 152. Processor 152 provides circuitry to support standard cellular telephone functions such as call timing, automatic shut-off, and automatic call-answering, as well as speaker controls and signals for on- and off-hook. RAM 154 is used to enable features such as storing telephone numbers, one-number speed-dial, and last number recall. Controller 150 is electrically connected to each of the input or output devices (RF circuitry 105, speaker 302, display 125, user input interface 130, and microphone 303) through input/output interface 156.

Power is provided to cellular telephone 100 by main power source 115, which is either a battery or an external power source such as an A/C to D/C adaptor. The telephone is turned off and on by toggling power switching circuitry 110 which is electrically connected to main power source 115. Power switching circuitry 110 is connected to and controlled by, in the embodiment shown, power control device 151. Power switching circuitry 110 also controls the application of power to display 125 and RF circuitry 105. In the embodiment shown, RF circuitry 105 and display 125 are on separate lines in order to allow power to be applied independently to each device. Backup power 120 is, in one embodiment, a button-type battery for ensuring uninterrupted power to controller 150. According to the embodiment shown, backup power 120 is connected to power control 151 in order to provide continuous operation of real-time clock 155 and to prevent loss of the contents of RAM 154. If all power sources, including back-up power 120 simultaneously lose power or are disconnected, when power is restored clock 155 is reset to zero time and memory 154 is initialized to zeros.

An automatic scheduling program, for automatically activating or deactivating cellular telephone functions, is encoded in ROM 153. Through the user input interface 130 the user is able to schedule the activation or deactivation of particular cellular telephone functions as a one-time or repeating event. Scheduling information is stored in RAM 154 according to a process described below. The automatic scheduling program includes logic which programs the real time clock according to the scheduling information. This process is described in more detail below. The automatic scheduling program can be in one of two states—enabled or disabled. It is toggled between the two states by manipulating a key incorporated into user input interface 130. The user may at any time manually override the automatic scheduler by activating/deactivating a cellular telephone function directly through user interface 130.

In the embodiment shown, real-time clock 155 is a low-power device providing time-of-day and multi-year calendaring functions, and may optionally include alarm features. Such controllers are commonly known and used in devices such as watches, computers, and video cassette recorders. One example of such a device is the low power clock calendar manufactured by Philips Semiconductors® (product specification PCF8593). Controllers used in watches generally provide single-event scheduling, while those used in computers support scheduling the activation of multiple applications. A preferred embodiment of the present invention incorporates a controller similar to those used in video cassette recorders, supporting activation and deactivation of system functions based on a time-based schedule. It should be noted that the system of the invention can incorporate any one of these or similar controllers without departing from the spirit or scope of the invention.

Figure 2:
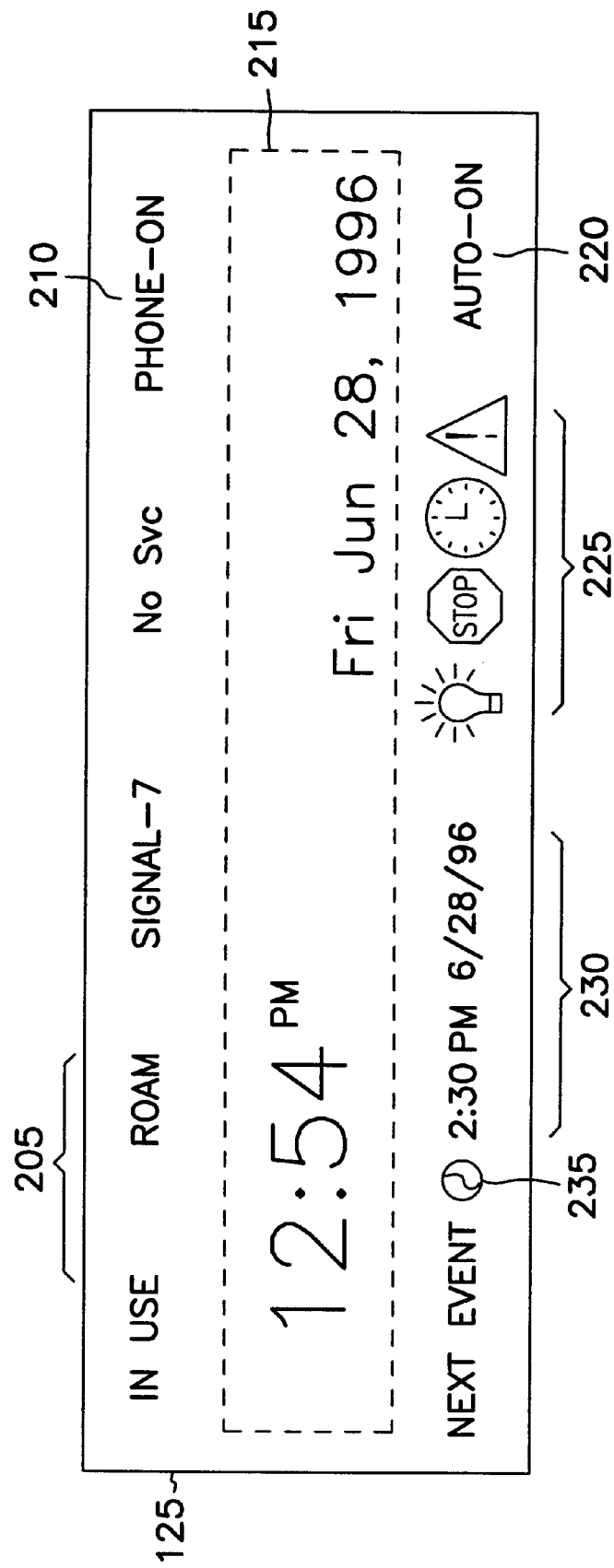
FIG. 2 is a block diagram of the display of a cellular telephone according to one embodiment of the present invention.

Display 125 provides a visual presentation of information and indicators reflecting the status of various functions of the cellular telephone 100. As shown in FIG. 2, display 125 contains regular cellular telephone status indicators 205 such as 'In Use', 'Roam', 'Signal-7' and 'No Svc'. Display 125 also contains phone status indicator 210 which, in one embodiment, is visible when the cellular telephone is turned on. There is also an indicator 220 which is visible when the automatic scheduling program (described below) is activated. When the automatic scheduling program is active, the time and date of the next event is displayed 230, as well as an icon 225 representing the type of event. FIG. 2 shows four examples of such icons 225 (the light bulb for 'on', the stop sign for 'off', the clock for 'alarm set', and the exclamation mark for 'reminder set'). Only one icon is displayed at any one time. The event repetition indicator 235 is visible when the next event is a recurring event. In one embodiment a letter is superimposed on the event repetition indicator, the letter representing the cycle period (for example 'D' for daily and 'W' for weekly). Information such as number dialed, caller id information and status information is presented on the alpha-numeric portion 215 of display 125. In one embodiment, the current date and time is displayed on the alpha-numeric portion 215 of display 125 whenever that portion of display 125 is unused by other functions and either the cellular telephone is in stand by mode or the automatic scheduler is enabled. In another embodiment, the current date and time continues to be shown on display 125 even when the cellular telephone 100 is off and the automatic scheduling program is inactive.

Figure 3:
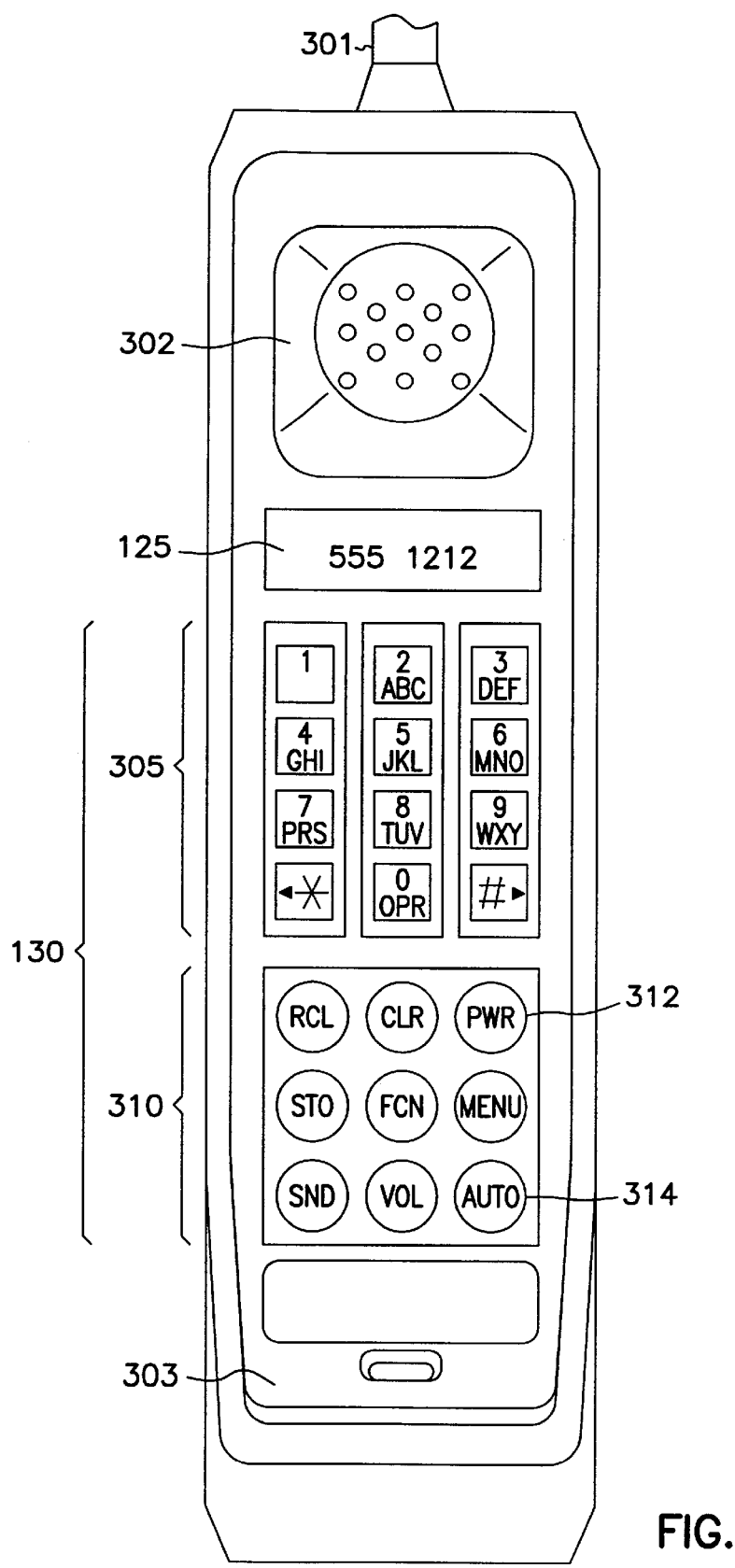
FIG. 3 is a block diagram of the face of a cellular telephone according to one embodiment of the present invention.

An example of the external features of a cellular telephone 100, according to one embodiment of the present invention, is shown in FIG. 3. Antenna 301, earpiece 302 and mouthpiece 303 employ technology well-known in the art and will not be discussed further. In the example shown, display 125, described earlier (FIG. 2 and accompanying text), is an alphanumeric liquid crystal display (LCD). Those skilled in the art will recognize that other display technologies can be used without affecting the scope of the present invention. The user inputs information and commands into cellular telephone 100 via a user interface 130, which comprises, in the embodiment shown, a standard twelve key alphanumeric pad 305 and control keypad 310. Control keypad 310 comprises keys for controlling the various standard functions supported by the cellular telephone. In the embodiment shown, PWR 312 is a single button which toggles the cellular telephone on and off. AUTO 314 is a toggle which enables and disables the automatic scheduler program incorporated in controller 150.

The cellular telephone 100 of the present invention is always in one of three modes—on, stand by, or off. When the cellular telephone 100 is off, the user can neither initiate nor receive telephone calls. This is the state with the lowest power consumption. The only element drawing power is the controller 160, which is maintaining the memory 154 and real-time clock 155. The automatic scheduling program may be enabled or disabled. If the automatic scheduling program is disabled then there are no interrupts generated based on the schedule stored in memory 154, and all cellular telephone functions remain inactive until either the cellular telephone is set to stand by mode or the automatic scheduling program is enabled. When the cellular telephone 100 is in stand by mode, it uses more power. In this state the user is able to initiate and receive calls. If the automatic scheduling program is disabled when the cellular telephone is in stand by mode, the cellular phone operates as a standard cellular telephone, all functions being manually activated and deactivated by manipulation of the user input interface 130. If the automatic scheduling program is enabled when the cellular telephone is either off or in stand by mode, the appropriate indicators are visible on display 125 and the real-time clock 155 initiates interrupts based on the contents of the schedule table stored in memory 154. The third cellular telephone mode, 'on', uses the most power, and occurs only when the cellular telephone is actually receiving or transmitting signals. When the cellular telephone 100 is in 'on' mode any scheduled event is deferred until the user disconnects and the cellular telephone returns to either a stand by or off state.

Figure 4:
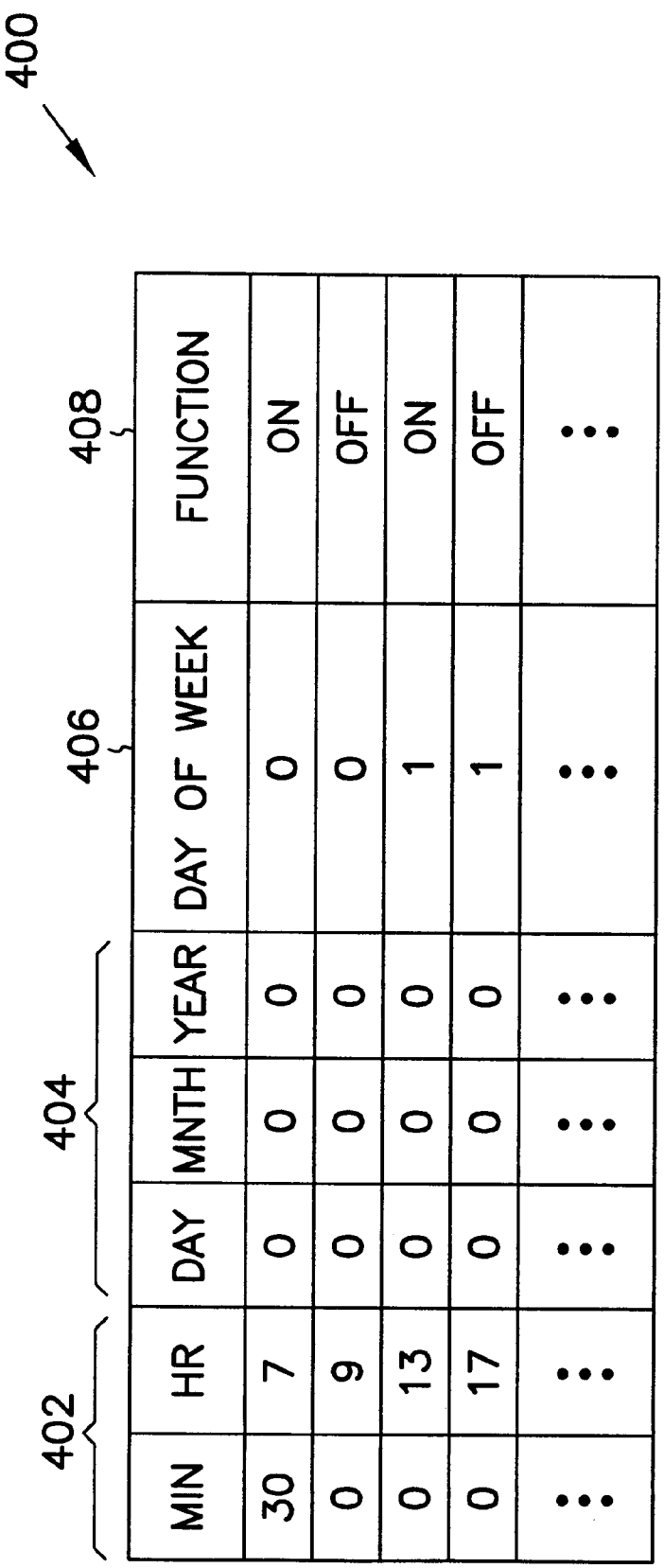
FIG. 4 is an activation schedule table according to one embodiment of the invention.

The automatic scheduler is driven by information stored in an activation schedule table which is in the cellular telephone's memory 154. FIG. 4 illustrates one embodiment of an activation schedule table 400. There is one row of information stored in the activation schedule table 400 for each time some function of the cellular telephone is to be activated or deactivated. Each row of information contains the respective time 402 (hour and minute), date 404 or day of the week 406 values and the encoded function 408 to be executed at the specified time and date. Those skilled in the art will recognize that alternate storage schemes may be employed without expanding the scope of the present invention. The user stores new control information or modifies existing control information in the schedule table 400 using the cellular telephone's user interface 130. Time information 402 may be either twelve- or twenty-four hour time notation. The user may also set a specific date 404 or day of the week (for example a value of 1 through 7) 406. If both date 404 and day of the week 406 are zero then the associated function 408 is processed every day at the indicated time. A recurring event may be scheduled by setting date 404 to zero and specifying the day of the week 406 on which the event is to occur. The user may further control the pattern and frequency of execution by specifying a date 404 or day of the week 406 in addition to the time 402. If both the date 404 and day of the week 406 are non-zero then any conflict is resolved in favor of the specific date 404. In a further embodiment, where a more advanced controller 150 is used (one that is calendar- and time-based, rather than just time-based), the schedule also accommodates holidays and the distinction between week- and weekend-days.

Logic embodied in the automatic scheduler interprets the function 408 to determine what action to take at the indicated time 402. In the embodiment shown, a function value of "1" is interpreted by the scheduler logic as a 'power on' command to the power switching circuitry 110. A function value of "0" is interpreted by the scheduler logic as a 'power off' command to the power switching circuitry 110. Those skilled in the art will recognize that the automatic scheduler logic is easily extensible to control additional cellular telephone functions, such as call waiting and call forwarding, by including additional logic to respond to additional function codes in the activation schedule table 400. In another embodiment the activation table is structured to have a column for each function which contains a value indicating whether the function is to be deactivated or activated. The preferred embodiment of the system of the invention uses firmware-controlled logic employing a combination of time and function. This allows the cellular telephone's functions to be easily programmed to correlate to even the most varied of personal schedules. Those skilled in the art, however, will recognize that the logic may also be embodied in software, hardware, or some combination of two or more of the three methods without exceeding the scope and spirit of the present invention.

Figure 5:
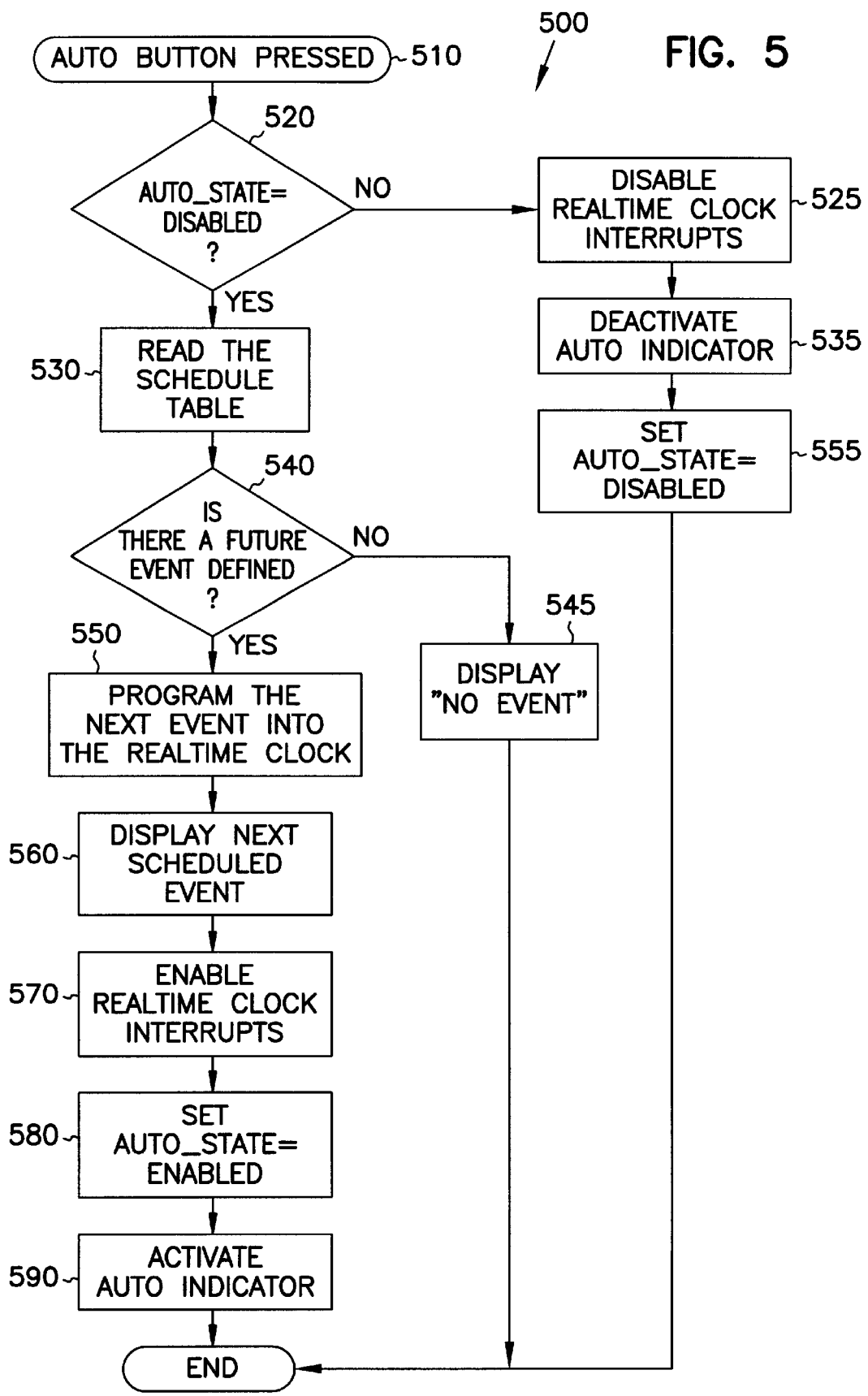
FIG. 5 is a flow chart of the logic executed when processing the information stored in the activation table of FIG. 4.

FIG. 5 is a flow chart of the automatic scheduler logic 500 which controller 150 executes when processing the information stored in activation table 400. The scheduling logic is initiated at block 510 when the AUTO button 314 is pressed. First the state of the automatic scheduler is evaluated at block 520. If the automatic scheduler is in the enabled state, when the AUTO button 314 is pressed the real-time clock interrupts are disabled at block 525, the AUTO ON indicator 220 is deactivated at block 535 and removed from display 125, and the Auto-State is set to 'disabled' at block 555. If, however, at block 520 the state of the automatic scheduler is 'disabled', then at block 530 the logic reads through schedule table 400. If there is not at least one future event defined (block 540) then the message "No Event" is displayed in the next event field 230 on display 125 at block 545. If one or more future events are defined (block 540) then at block 550 the next event in chronological order is programmed into the real time clock 155. Once the next event is scheduled the pertinent information is displayed at block 560 in the next event field 230. Next the logic enables real time clock interrupts at block 570, such that the scheduled events trigger cellular telephone functions. The automatic scheduler is then placed in an 'enabled' state (block 580) and the Auto-On indicator 220 is illuminated 590 on display 125.

Figure 6:
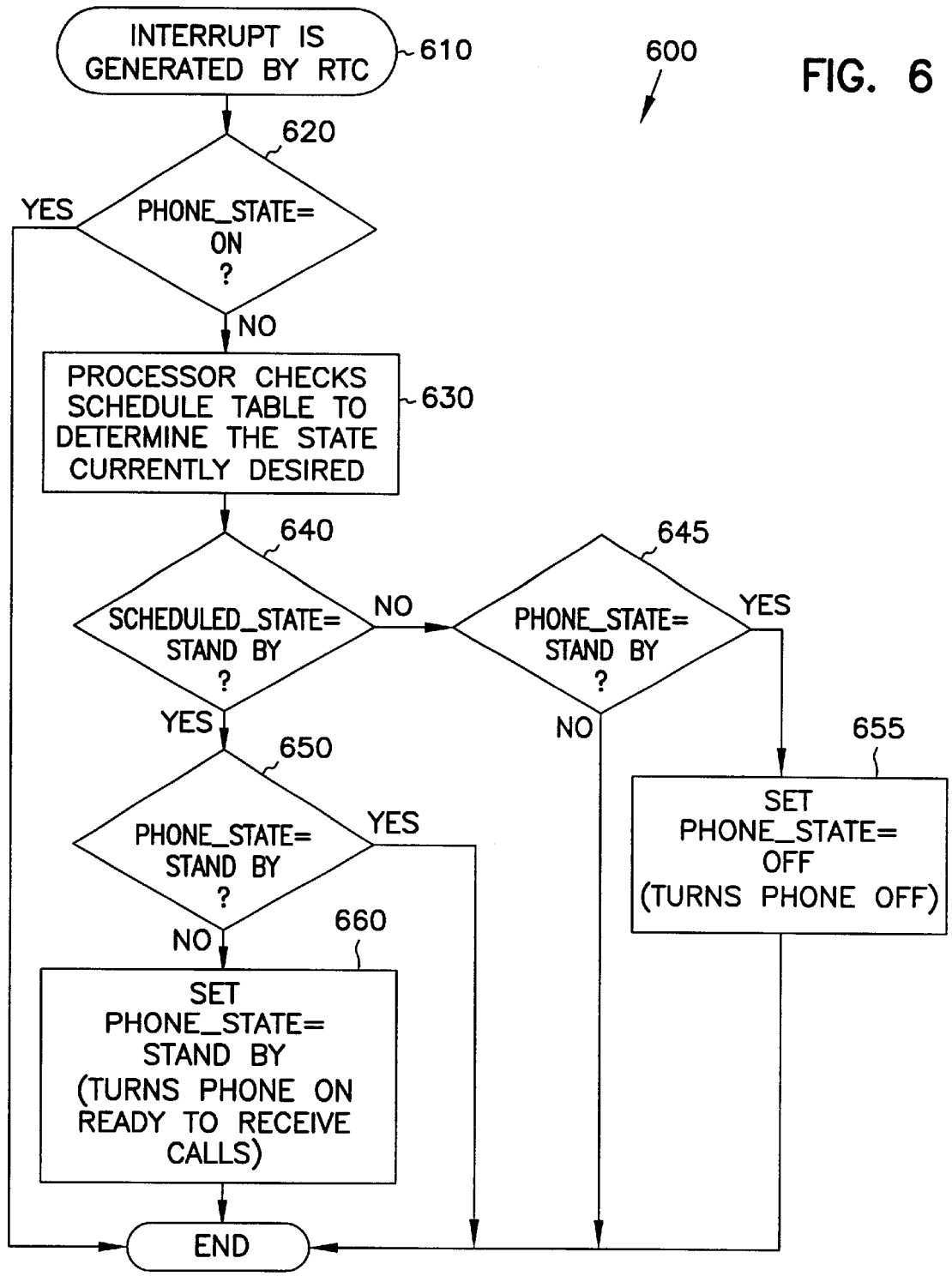
FIG. 6 is a flow chart of the logic executed when processing interrupts generated by a real time clock.

FIG. 6 is a flow chart 600 of how the automatic scheduler processes interrupts generated by the real time clock. At block 610 the process is initiated by the real time clock 155 generating an interrupt. This processing is only performed when the automatic scheduler is in the 'enabled' state. When the automatic scheduler receives an interrupt, it first polls the cellular telephone at block 620 to determine the current state of the telephone. If the telephone is in the 'on' state, the scheduled state which is the subject of the interrupt is deferred until the telephone returns to a state of 'off' or 'stand by'. If at block 620 the telephone is not in the 'on' state, at block 630 the processor checks the schedule table 400 to determine the desired state according to the associated function 408. The scheduled state can be either 'stand by' or 'off'(block 640). If the scheduled state is 'off' then the logic determines at block 645 whether the current telephone state is 'stand by' or 'off'. If the telephone is already off then the logic does nothing further, but if the telephone is currently in 'stand by' mode then at block 655 the logic sets the current telephone state to 'off'. At block 640, if the scheduled state is 'stand by', then the logic checks the telephone's current state at block 650. If the telephone is already in 'stand by' mode then nothing more is done, but if the telephone is currently off then at block 660 the logic sets the telephone state to 'stand by', making the telephone ready to place or receive calls.

Figure 7:
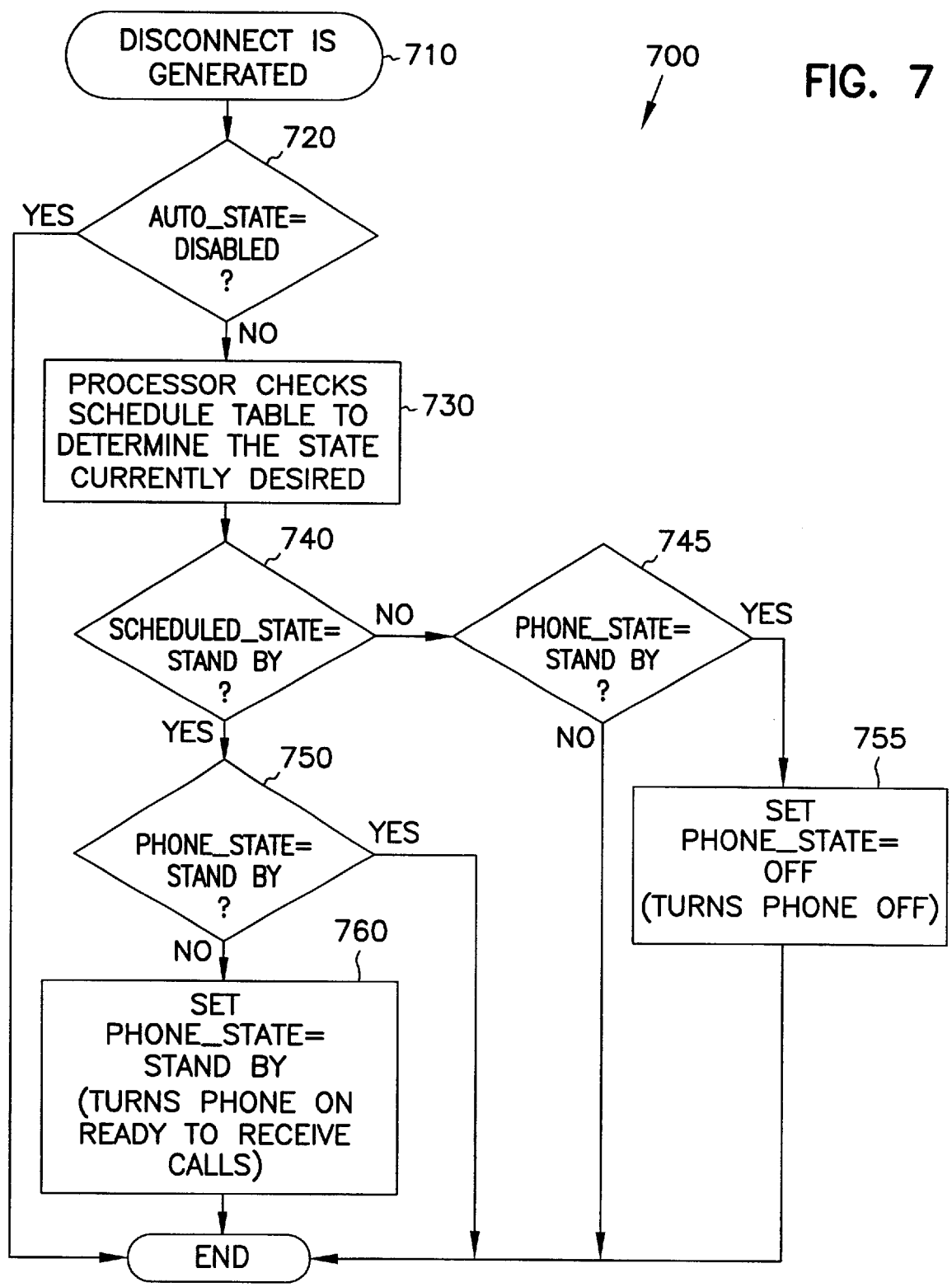
FIG. 7 is a flow chart of the logic executed when processing a telephone disconnect.

FIG. 7 is a flow chart of the automatic scheduler logic 700 which controller 150 follows when processing a telephone disconnect. The phone state must be 'on' to generate a disconnect. A disconnect is generated (block 710) by terminating a call. The logic first determines at block 720 whether the automatic scheduler state is disabled. If it is, then no further processing is done in this loop. If, however, the automatic scheduler is enabled, the processor then checks at block 730 whether there are any pending functions to be executed or any deferred interrupts to be processed. If either is true, then at block 740 the logic determines whether the scheduled state is 'stand by' or 'off'. If the scheduled state is 'off' then the telephone is polled to determine its current state at block 745. If the current state is 'off' then nothing more is done, but if the current state is 'stand by' then the current phone state is set to 'off' at block 755. If at block 740 the scheduled state is 'stand by' then the telephone is polled at block 750 to determine its current state. If the current state is 'stand by' then nothing more is done, and if the current state is 'off' then at block 760 the telephone's current state is set to 'stand by', making the telephone available to place or receive calls.

Figure 8:
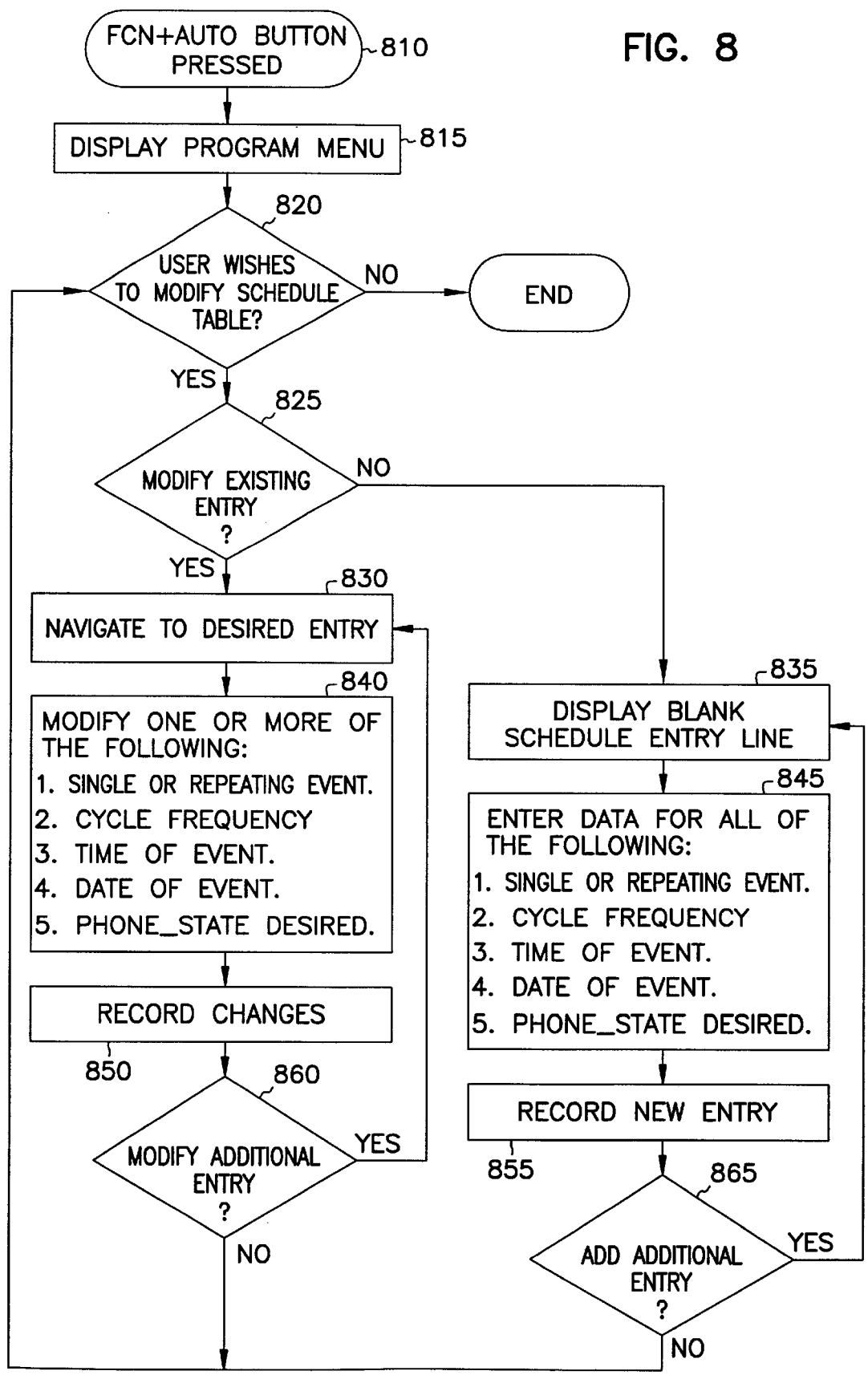
FIG. 8 is a flow chart of the process followed to program the activation table of FIG. 4.

FIG. 8 is a flow chart of the process followed to program activation table 400. The process is initiated at block 810 when the user selects the FCN and AUTO 314 buttons on the telephone keypad 310. In response, at block 815, the automatic scheduler logic displays the program menu on display 125. The use then decides at block 820 whether they wish to modify the schedule table. If they do not then the program ends. If they wish to make modifications then at block 825 the user has to decide whether they wish to modify an existing entry or create a new entry. If the user is going to modify an existing entry, first they must navigate to the desired entry at block 830 using the telephone keypad 130 to scroll up and down through the list of schedule entries. Once the desired entry is located, the user at block 840 modifies one or more features of the entry, such as whether the event occurs once or is repeated, the cycle of a repeating event, the date and/or time of the event, or the function to be executed. Once the user is satisfied with the modification(s), the changes are recorded at block 850 to the schedule table 400, and then the user has the opportunity at block 860 to either quit or process another entry. If the user wishes to modify another entry the logic loops back to block 830 where the user navigates through the list to find the next entry to modify. Back at block 825, if the user decides to create a new entry, the logic presents a blank entry screen at block 835. The user then enters, at block 845, the information required to complete a new record in the schedule table 400, including identifying whether it is a single or repeating event, the cycle frequency if it is a repeating event, the data and time of the event, and the function to be executed. Once the user is satisfied with the data input the record is written to the schedule table 400 at block 855. The user then has the opportunity at block 865 to create additional table entries. If the user decides to make more entries the logic loops back up to block 835 where the logic displays a new blank entry screen, otherwise the logic terminates.

The user is able to override the automatic scheduler at any time and activate or deactivate cellular telephone 100 using the manual switch 312. Manual override will change the current state of the telephone 100 but will not affect subsequent operation of other programmed activities so long as the automatic scheduler remains active. As shown in FIG. 2, controller 210 is connected directly to power sources 120, 130 in order to allow operation of the automatic scheduler regardless of the state of the cellular telephone 100. The automatic scheduler logic allows the user to better manage use of the power provided by main power source 115 by only activating the telephone 100 during those times calls are most likely to be sent or received via the cellular telephone 100. It also enables the user to better control their costs by controlling air time usage. The ability to schedule the automatic initiation of future events also increases user convenience. As an example, if the user must be available as part of a call-forwarding schedule, the user can program their cellular telephone to activate and deactivate according to the schedule. This ensures both that no calls are missed by the user forgetting to activate the cellular telephone, and also that the user does not get extra calls due to their forgetting to deactivate the cellular telephone when their time to receive forwarded calls expires.

Additional embodiments of the present invention take advantage of advanced features of the clock 155 and cellular telephone 100. In one such embodiment the schedule table 400 is expanded to include short messages. An interrupt generated when the time entry 402 in the schedule table 400 matches the time on the clock 155 causes an associated message (not shown) to be displayed on the telephone's display 125. In another embodiment the alarm function of the clock is integrated in the logic of controller 150, thereby providing alarm/remind functions to the user. In one embodiment the controller causes the cellular telephone 100 to ring at a preset time, acting as a simple alarm. When coordinated with the message display function, the alarm reminds the user to, for example, make a call and the display shows the number to be called. The user simply presses the 'send' key to place the call. According to the example, the function field 408 contains a value indicating it is an alarm/reminder, which the automatic scheduler logic processes by printing the associated message on the cellular telephone's display 125.

It is to be understood that the above description is intended to be illustrative, and not restrictive. Many other embodiments will be apparent to those skilled in the art upon reviewing the above description. The scope of the invention should, therefore, be determined with reference to the appended claims, along with the full scope of equivalents to which such claims are entitled.

What is claimed is:

1. A programmable cellular telephone, comprising:

communication circuitry for sending and receiving telephonic signals; and a controller for controlling the cellular telephone coupled to the communication circuitry, wherein the controller enables and disables at least one selected function of the communication circuitry in accordance with a schedule specifying an absolute time set by a user of the celluar telephone to enable or disable the at least one selected function, wherein the at least one selected function is contained in an activation schedule table having a plurality of functional codes that represent cellular telephone features.

2. The cellular telephone of claim 1, further comprising user interface circuitry coupled to the controller, and wherein the controller further enables and disables selected functions of the user interface circuitry.

3. The cellular telephone of claim 2, wherein the user interface further comprises an output interface, the output interface comprising a display of a status of the cellular telephone.

4. The cellular telephone of claim 3, wherein the schedule comprises a plurality of events ordered by time, and the output interface further comprises a display of an event which is next in chronological order in the plurality of events.

5. The cellular telephone of claim 1, wherein the controller enables and disables complete operation of the communication circuitry.

6. The cellular telephone of claim 1, wherein the controller further comprises a memory device coupled to the circuitry for storing the schedule.

7. The cellular telephone of claim 6, wherein the user interface circuitry comprises an input interface for modifying the schedule stored in the memory.

8. The cellular telephone of claim 1, wherein the user interface further comprises a user-activated switch coupled to the controller for enabling and disabling the schedule.

9. The cellular telephone of claim 1, wherein the controller further comprises a real-time clock, and wherein the real-time clock issues one or more interrupts according to the schedule.

10. The cellular telephone of claim 9, wherein the controller displays a message on the output interface in response to the one or more interrupts.

11. The cellular telephone of claim 9, wherein the controller sounds an audible alarm in response to the one or more interrupts.

12. The cellular telephone of claim 1, wherein the at least one selected function is selected from a group consisting of power switching between the communication circuitry and a power source, call timing, automatic shut off, automatic call answering, call forwarding, call waiting, and alarm functions.

13. The cellular telephone of claim 12, wherein multiple functions from the group are selected, and enabled and disabled by the controller.

14. A method of internally controlling cellular telephone functions, the cellular telephone comprising a power switch and a controller, the controller comprising a clock and a memory, the method comprising the steps of:

providing a clock signal representative of time;

providing an activation schedule table comprising a plurality of functional codes that represent cellular telephone functions to be enabled or disabled and an associated absolute time when each telephone function is to be enabled or disabled;

comparing the clock signal with the activation schedule table; and enabling or disabling selected functions based on the comparison of the clock signal with the activation schedule table.

15. The method of controlling cellular telephone functions of claim 14, and further comprising the step of revising the schedule using a user interface.

16. The method of controlling cellular telephone functions of claim 14, wherein the step of enabling or disabling selected functions is deferred when the cellular telephone is actively sending or receiving telephonic signals.

17. The method of controlling cellular telephone functions of claim 14, wherein the step of enabling or disabling selected functions is enabled or disabled by a user-activated switch.

18. A programmable cellular telephone, comprising:

an activation schedule table having a plurality of functional codes that represent cellular telephone features, a controller for controlling the cellular telephone enclosing the activation schedule table, wherein the controller enables and disables one or more of the plurality of functional codes in accordance with a schedule specifying an absolute time set by a user of the cellular telephone.

19. The programmable cellular telephone as in claim 18, wherein the activation schedule table has the functional codes for receiving a cellular telephone call.

20. The programmable cellular telephone as in claim 18, wherein the controller controls the cellular telephone availability for purposes of minimizing unwanted interruptions and extending battery life.

21. The programmable cellular telephone as in claim 18, wherein the controller controls the cellular telephone availability by disabling less than all of the cellular telephone's functions at one time.

22. The programmable cellular telephone as in claim 18, wherein the controller controls the cellular telephone availability, wherein one function that remains enabled even though other functions are disabled is that of a call out function.

* * * * *